May 18, 1937.　　　　C. E. STARR　　　　2,080,937
TRANSMISSION GEARING
Filed March 14, 1935
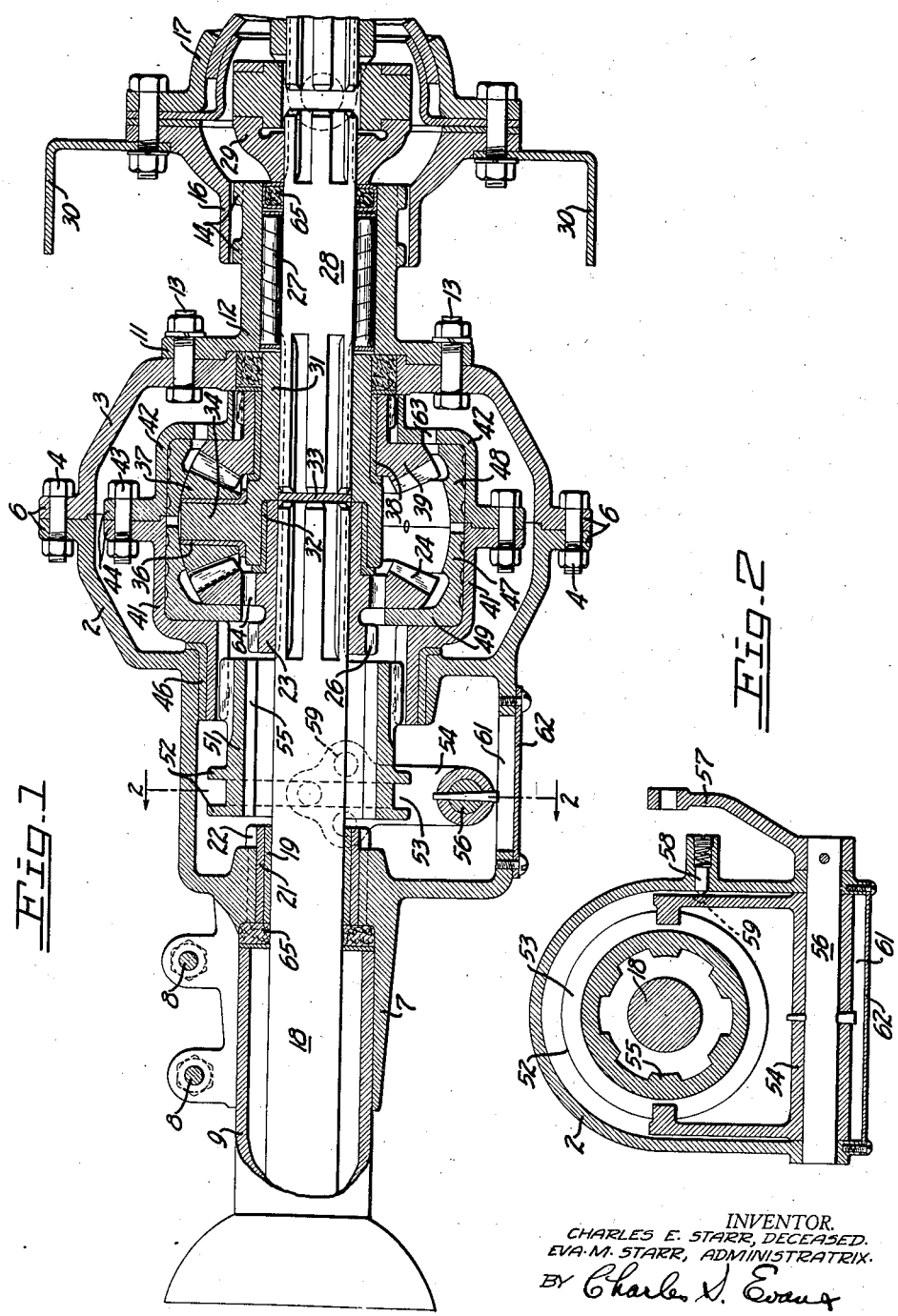
INVENTOR.
CHARLES E. STARR, DECEASED.
EVA·M·STARR, ADMINISTRATRIX.
BY Charles N. Evans
HER ATTORNEY Patented May 18, 1937

2,080,937

UNITED STATES PATENT OFFICE 2,080,937

TRANSMISSION GEARING

Charles E. Starr, deceased, late of Inglewood, Calif., by Eva M. Starr, administratrix, Inglewood, Calif., assignor to Perfecto Gear Differential Co., Bellingham, Wash., a corporation of Washington Application March 14, 1935, Serial No. 11,032

4 Claims. (Cl. 74—288)

The invention relates to transmission gearing especially for use in automobiles, and one of the objects of the invention is the provision at a low cost of an auxiliary transmission unit adapted to be interposed in the propeller shaft of an automobile for the purpose of giving additional range of speed changes.

Another object of the invention is the provision, in a transmission mechanism, of improved means for connecting the parts together. In prior mechanisms of this type, one of the beveled gears of the planetary system has been locked with the beveled planet pinion mounting, thus preventing rotation of the planet pinions on their journal axis. This arrangement places certain stresses upon the pinion gears and mounting which are desirable to avoid. A purpose of this invention is to provide means whereby the beveled gears of the planetary system are locked together, so that the driving stress is applied on both sides of each planet pinion thereby balancing the forces and thus avoiding undesirable strains which are prone to cause failure of parts and noisy operation.

This invention possesses other objects and features of advantage, some of which, with the foregoing, will be set forth in the following description of the preferred form of the invention which is illustrated in the drawing accompanying and forming part of the specification. It is understood that the invention is not limited to the showing made by the said drawing and description, as variations of the preferred form within the scope of the invention as set forth in the claims may be adopted.

In the drawing:

Figure 1 is a vertical sectional view of the transmission taken in a plane passing thru the longitudinal axis of the propeller shaft. At the left the severed end of the torque tube is shown enclosed within the housing of the transmission, and at the right is shown part of the universal joint.

Figure 2 is a vertical sectional view taken in the plane indicated by the line 2—2 of Figure 1.

In the majority of automobiles, the number of speed changes is unduly limited. This limitation in the speed changes is undesirable, especially in those automobiles that are used for trucking purposes. The inventor's problem in designing an auxiliary transmission that will fulfill this need is not only mechanical but also commercial. He must not only supply a mechanically satisfactory job, but it must be of such a nature that it can be manufactured and sold at a price within the reach of probable buyers. The invention described herein fulfills these terms. By a few simple operations, the herein disclosed transmission unit may be interposed in the propeller shaft and torque tube of the car for which it is designed. By its use, the previous number of speeds will be doubled.

In broad terms, the invention comprises a housing adapted to be interposed in the torque tube. Means are provided for connecting the housing securely as a continuation of the torque tube. Speed change gears are provided in the housing, adapted to be interposed in the propeller shaft. A control lever and connections complete the assembly. In the form illustrated, a transmission is provided for inclusion in an assembly in which a unit, lying between a universal joint adjacent the gear box and a second universal joint a short distance further back, is adapted to be removed for the purpose; it being the intention of the manufacturer of one of the well known automobile trucks to provide means for the ready introduction of an auxiliary transmission in the driving line.

The transmission is contained within a closed housing comprising portions 2 and 3 connected by bolts 4 thru abutting flanges 6. The portion 2 is provided at its outer end with a split neck 7, adapted by means of the bolts 8 to be clamped firmly about the severed end of the torque tube 9, so that in effect it is part of the torque tube. The outer end of the housing portion 3 is secured to the flange 11 of the hub 12 by means of the bolts 13. The flanges 14 on the periphery of the hub are splined to receive the housing portion 16 of the universal joint 17.

Since the transmission is to be used in an already existing machine, in which there is a replaceable unit provided for the purpose of installing such an auxiliary transmission, the torque tube is severed in order to interpose the unit in the power line. The propeller shaft, connected with the universal joint adjacent the gear box of the automobile, forms the driving shaft 18 in the transmission. The severed end of this shaft may be splined and used in connection with the transmission, but it is preferred that this shaft be furnished with the unit. This driving shaft is journaled in the bushing 19, in the sleeve 21, which is splined in fixed position in the housing portion 2 and has formed at one end, on its periphery, the outwardly extending clutch means or teeth 22.

Splined in position at the severed end of the driving shaft is the sleeve 23, which serves as a hub for the beveled gear 24 and has formed at one end, on its periphery, the outwardly extending clutch means or teeth 26.

Journaled in the hub 12 in the roller bearing 27 is the driven stub shaft 28, on the rear of which is mounted the yoke member 29 of the rear universal joint 17 supported on the chassis frame by the cross girts 30. Preferably, the original yoke member is disassembled from the already existing propeller shaft and reassembled on the end of the stub shaft which is preferably furnished with the transmission.

Splined on the forward end of the driven shaft 28, and projecting beyond the end of the shaft, is the sleeve 31. In order to insure the alignment of the drive and driven shafts, the sleeve 23 is journaled in the projected part of the sleeve 31 in the bushing 32. A disk bushing 33 provides bearing surfaces between the drive and driven shafts.

Mounted in spoke fashion on the periphery of the sleeve 31 is the stub shaft 34, on which the bushing 36 is fitted and the beveled pinion 37 is journaled, so that in effect the pinion stub shaft 34 and sleeve 31 form a planet pinion mounting. Preferably there are three such stub shafts and pinions spaced equally about the periphery of the sleeve. The arrangement of this mounting is such that when the transmission is assembled, the beveled planet pinions are meshed with the shaft-fixed beveled gear 24.

Loosely journaled on the sleeve 31, on the bushing 38, is the beveled gear 39 in mesh with the pinions 37.

A rotor hood, enclosing the planetary gear system and comprising the portions 41 and 42 connected by the bolts 43 thru abutting flanges 14, is journaled at one end in the housing portion 2 in the bushing 46 and at the other end is splined to the loose gear 39, so that the loose gear and the rotor are connected for rotation together.

Since in the operation of beveled gears, the thrust of the gears tends to move the gears axially out of mesh, means are provided for retaining the beveled gears and the beveled pinions in proper operative position. This is accomplished by means of the bushings 47 and 48, which are disposed between the planetary gears and the rotor. Recesses in the bushings permit lubricant to reach all moving parts. The major portion of the inner surface of the bushings is spherical to provide a bearing surface for the spherical outer surfaces of the beveled pinions. The bushing 47 is provided with a bearing flange 49 disposed between the beveled gear 24 and the rotor portion 41, thus preventing the axial separation of the gears.

Means are provided so that the rotor hood, and hence the loose gear, may be optionally locked with either the fixed element 22 or the clutch means 26. This means is accomplished by the clutch member or sleeve 51 which is loosely mounted on the driving shaft and splined to the rotor portion 41 so that it may have axial movement therewith. The clutch sleeve has internally extending clutch teeth 55, adapted to be engaged with either the fixed element 22 or the clutch means 26, by means of a shifting mechanism as follows:

Formed at one end, on the periphery of the clutch sleeve, are the spaced flanges 52 forming the annular groove 53 in which a shifting yoke 54 is adapted to engage. The yoke is fixedly mounted on the shaft 56 which is journaled in the housing portion 2 and is actuated by the lever 57, which is clamped on the shaft 56 and connected by means of suitable links to a lever conveniently placed near the hand of the driver.

Since the fixed element, or clutch teeth 22, are prevented from rotating because they are formed on the sleeve 21 which is fixed to the housing, the engagement of the clutch sleeve with the fixed element, results in holding the rotor and consequently the loose gear 39 against rotation; with this connection, rotation of the driving shaft by the power plant effects a planetation of the planet pinions and a consequent rotation of the planet pinion mounting and connected driven shaft at a lower speed. With the simple planetary gear as shown the gear ratio is 2 to 1, however it is obvious that other ratios may be secured by the use of compound planet gears, and beveled gears of different sizes.

Engagement of the clutch sleeve with the clutch means or teeth 26, locks the rotor and hence the loose gear for rotation with the driving shaft. Since the loose gear and shaft fixed gear are locked together, there can be no rotation of the planet pinions, and the driven shaft is rotated at the same speed as the driving shaft, by stresses applied on each side of the planet pinions, the two beveled gears being in effect a yoke thru which the driving torque is applied on the opposite sides of the stationary planet pinion.

It should be noted that when the loose gear and shaft fixed gear are locked together the driving torque is transmitted to the planet pinion mounting, and hence the driven shaft, thru both sides of the planet pinions. Hence the driving stress is applied on both sides of each planet pinion, thus avoiding undesirable stresses which are apt to cause failure of parts and noisy operation.

The spring-pressed pin 58, mounted in a suitable slideway in the housing, and adapted to engage the spaced seats 59 provides a means for resiliently holding the clutch member in engagement with either the fixed element or the clutch means on the shaft fixed gear. Figure 2 shows the pin in the neutral position of the clutch sleeve.

The housing is designed so as to facilitate the assembly of the parts. The aperture 61 normally covered by the plate 62 provides a means for assembly of the shifting mechanism.

Suitable fittings for the introduction of lubricant are applied in a well known manner. Apertures 63 and 64 in the rotor and shaft fixed gear respectively, allows free passage of the lubricant to the moving parts. The packing rings 65 prevent the escape of lubricant from the transmission housing.

From the above it will be understood that in installing the transmission, the cutting off of the torque tube constitutes the major portion of the work, the remainder being merely the assembly of parts which readily fit together.

What is claimed is:

1. In a transmission, a driving shaft, a driven shaft, a gear fixed on the driving shaft, a loose gear disposed about the driven shaft, a planet pinion in mesh with said gears and mounted on said driven shaft, a clutch member, a rotor hood enclosing the gearing and connecting the clutch member for rotation with the loose gear, a fixed element, and clutch means on the shaft-fixed gear and on the fixed element optionally engageable with the clutch member.

2. In a transmission, a driving shaft, a driven shaft, a gear fixed on the driving shaft, a loose gear disposed about the driven shaft, a planet pinion in mesh with said gears and mounted on said driven shaft, a clutch member, a rotor hood enclosing the gears and connecting the clutch member for rotation with the loose gear, means supported by said hood for holding the gears and pinion in mesh, a housing for the transmission, and clutch means on the shaft-fixed gear and on the housing optionally engageable with the clutch member.

3. In a transmission having aligned shafts connected by planetary gearing, a housing enclosing the transmission, a clutch sleeve, a hood enclosing the planetary gearing and journaled in said housing and at one end fixed for rotation with one of the gears and at the other end fixed for rotation with the clutch sleeve, means supported by said hood for holding the planetary gearing in mesh, clutch teeth on the housing and on one of the other gears with which the clutch sleeve is optionally engageable, and means for moving the clutch sleeve.

4. In a transmission, a housing, a pair of aligned shafts journalled in the housing, a planet pinion mounting having a hub fixed on one of the shafts, a gear journalled on said hub, a rotor having one end fixed to said gear and having the other end journalled in the housing, a sleeve slidably mounted for rotation with the rotor, a gear fixed on the other shaft, a planet pinion on said mounting and meshed with said gears, and clutch elements on the latter gear and on the housing with which the sleeve is optionally engageable.

EVA M. STARR,
*Administratrix of the Estate of Charles E. Starr, Deceased.*